(12) United States Patent
Alexander et al.

(10) Patent No.: US 7,958,085 B1
(45) Date of Patent: Jun. 7, 2011

(54) MANAGING MEDIA-CONTENT LICENSES, INCLUDING OPTION FORMATION

(75) Inventors: James Alexander, Mount Kisco, NY (US); Mark Richards, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 186 days.

(21) Appl. No.: 11/075,051

(22) Filed: Mar. 7, 2005

(51) Int. Cl.
*G06F 7/00* (2006.01)
*G06F 17/00* (2006.01)
*G06Q 50/00* (2006.01)

(52) U.S. Cl. ........ 707/607; 707/942; 707/948; 705/310; 705/311

(58) Field of Classification Search ................ 707/3
See application file for complete search history.

(56) References Cited

U.S. PATENT DOCUMENTS

| | | | |
|---|---|---|---|
| 5,164,831 A | 11/1992 | Kuchta et al. | |
| 5,218,455 A | 6/1993 | Kristy | |
| 5,440,401 A | 8/1995 | Parulski et al. | |
| 5,926,624 A | 7/1999 | Katz et al. | |
| 6,006,231 A | 12/1999 | Popa | |
| 6,405,203 B1 | 6/2002 | Collart | |
| 6,629,104 B1 | 9/2003 | Parulski et al. | |
| 6,792,466 B1 | 9/2004 | Saulpaugh et al. | |
| 6,799,208 B1 * | 9/2004 | Sankaranarayan et al. | 709/223 |
| 6,853,728 B1 * | 2/2005 | Kahn et al. | 380/239 |
| 7,051,019 B1 | 5/2006 | Land et al. | |
| 7,099,849 B1 * | 8/2006 | Reeder et al. | 705/59 |
| 7,110,965 B1 | 9/2006 | Pierce | |
| 7,177,879 B2 * | 2/2007 | Flank et al. | 707/104.1 |
| 7,225,158 B2 | 5/2007 | Toshikage et al. | |
| 7,401,231 B2 | 7/2008 | Taki et al. | |
| 7,558,781 B2 | 7/2009 | Probst et al. | |
| 2002/0029150 A1 | 3/2002 | Vitale et al. | |
| 2002/0143976 A1 | 10/2002 | Barker et al. | |
| 2002/0156685 A1 | 10/2002 | Ehrlich et al. | |
| 2003/0066884 A1 | 4/2003 | Reddy et al. | |
| 2003/0182402 A1 | 9/2003 | Goodman et al. | |
| 2004/0044697 A1 * | 3/2004 | Nixon | 707/200 |

(Continued)

FOREIGN PATENT DOCUMENTS

EP 1077414 A3 8/2000

OTHER PUBLICATIONS

Amazon.com: Search Inside the Book, at latest Oct. 24, 2003, Amazon.com, http://www.amazon.com/exec/obidos/tg/browse/-/10197021/ref%3Dsib_merch_gw/104-9080657-8874316 [Accessed: Jan. 21, 2010].*

(Continued)

*Primary Examiner* — Pierre M Vital
*Assistant Examiner* — Jason Liao
(74) *Attorney, Agent, or Firm* — Robert C. Kowert; Meyertons, Hood, Kivlin, Kowert & Goetzel, P.C.

(57) ABSTRACT

Embodiments of methods, apparatuses, systems and/or devices for managing content are disclosed. Briefly, in accordance with one particular embodiment, managing content includes presenting one or more references to one or more digital media assets. A request to reserve one or more of the referenced digital media assets is received, and the references to one or more digital media assets are updated such that the references include data indicating that one or more of the referenced digital media assets have been reserved.

43 Claims, 5 Drawing Sheets

U.S. PATENT DOCUMENTS

| | | | |
|---|---|---|---|
| 2004/0133923 | A1 | 7/2004 | Watson et al. |
| 2004/0143597 | A1 | 7/2004 | Benson et al. |
| 2004/0179102 | A1* | 9/2004 | Matsufune ................ 348/207.1 |
| 2004/0216108 | A1* | 10/2004 | Robbin ........................ 718/100 |
| 2004/0243808 | A1 | 12/2004 | Ishiguro et al. |
| 2004/0254676 | A1* | 12/2004 | Blust et al. .................... 700/231 |
| 2005/0021550 | A1 | 1/2005 | Grasland et al. |
| 2005/0036158 | A1 | 2/2005 | House et al. |
| 2005/0058319 | A1 | 3/2005 | Rhoads et al. |
| 2005/0132120 | A1 | 6/2005 | Vijay |
| 2010/0114961 | A1* | 5/2010 | Powell .......................... 707/781 |

OTHER PUBLICATIONS m00nun 1t, Amazon Launches Full Text Book Search, Oct. 24, 2003, http://news.slashdot.org/article.pl?sid=03/10/24/0214257&tid=192 [Accessed: Jan. 21, 2010].*

Restatement(Second) of Contracts, 1981, Amercan Law Institute, Section 25.*

U.S. Appl. No. 11/100,951, filed Apr. 2005, Alexander et al.

Advisory action mailed Oct. 9, 2009 in co-pending U.S. Appl. No. 10/943,767, 4 pages.

Request for Continued Examination filed Oct. 28, 2009 in co-pending U.S. Appl. No. 10/943,767, 4 pages.

Office action mailed Sep. 30, 2009 in co-pending U.S. Appl. No. 11/148,598, 13 pages.

Amendment After Final filed Sep. 23, 2009 in co-pending U.S. Appl. No. 10/943,767, 18 pages.

U.S. Appl. No. 10/943,767, filed Mar. 23, 2006, Mierau et al.

Non-Final Office action, mailed Nov. 6, 2006 in co- pending U.S. Appl. No. 10/943,767, 14 pages.

Reply to action of Nov. 6, 2006 in co- pending U.S. Appl. No. 10/943,767, mailed Feb. 5, 2007, 10 pages.

Final Office action, mailed May 31, 2007 in co- pending U.S. Appl. No. 10/943,767, 14 pages.

Reply to action of May 31, 2007 in co- pending U.S. Appl. No. 10/943,767 mailed Jul. 27, 2007, 9 pages.

Advisory action mailed Aug. 7, 2007 in co- pending U.S. Appl. No. 10/943,767, 5b pages.

Request for Continued Examination, mailed Sep. 26, 2007 in co-pending U.S. Appl. No. 10/943,767, 1 page.

Non-Final Office action, mailed Dec. 31, 2007 in co- pending U.S. Appl. No. 10/943,767, 16 pages.

Applicant's Interview Summary held Dec. 5, 2007, mailed Jan. 7, 2008 in co- pending U.S. Appl. No. 10/943,767, 1 page.

Examiner's Interview Summary and Office Action Appendix, mailed May 9, 2008 in co-pending U.S. Appl. No. 10/943,767, 10 pages.

Amendment in reply to action of Dec. 31, 2007 in co- pending U.S. Appl. No. 10/943,767 mailed May 30, 2008, 16 pages.

Final Office action mailed Sep. 8, 2008 in co-pending U.S. Appl. No. 10/943,767, 17 pages.

Amendment filed Nov. 7, 2008 in co-pending U.S. Appl. No. 10/943,767, 15 pages.

Advisory action mailed Dec. 1, 2008 in co-pending U.S. Appl. No. 10/943,767, 4 pages.

RCE filed Dec. 5, 2008 in co-pending U.S. Appl. No. 10/943,767, 1 page.

Non-Final OA mailed Feb. 23, 2009 in co-pending U.S. Appl. No. 10/943,767, 16 pages.

Amendment After Final filed May 1, 2009 in co-pending U.S. Appl. No. 10/943,767, 17 pages.

Patent Application, filed Jun. 8, 2005 in co-pending U.S. Appl. No. 11/148,598, 28 pages.

Office action/Restriction Requirement mailed Oct. 6, 2008 in co-pending U.S. Appl No. 11/148,598, 7 pages.

Response to Restriction Requirement mailed Mar. 5, 2009 in co-pending U.S. Appl. No. 11/148,598, 11 pages.

Office action mailed Mar. 18, 2009 in co-pending U.S. Appl. No. 11/148,598, 15 pages.

Response filed Jun. 17, 2009 in co-pending U.S. Appl. No. 11/148,598, 20 pages.

"What is ShutterPoint?" by ASE Research Corp. Provided by Archive.org WayBack Machine. Created Jun. 25, 2003. Accessed Feb. 19, 2009. Available online at http:web.archive.org/web/20030625120521/http:www.shutterpoint.com/Home-Photographer.cfm, 2 pages.

Adobe Systems Incorporation, "Extensible Metadata Platform (XMP)", 2002, http:www.adobe.com/produccts/xmp/main.html, retrieved Jun. 16, 2008, 2 pages.

Brickley, Dan; et al., "Resource Description Framework (RDF) Schema Specification", Mar. 3, 1999, http:www.w3.org/TR/1999/PR-rdf-schema-19990303/, retrieved Feb. 19, 2009, 36 pages.

Digital Imaging Group, "DIG2000 File Format Proposal", Oct. 30, 1998 ISO/IEC JTCI/SG29/WG1N1017, http:www.i3a.org/pdf/wg1n1017.pdf, retrieved Aug. 13, 2008, 113 pages.

Dublin Core Metadata Initiative, "Dublin Core Metadata Element Set", Version 1.1, Jul. 2, 1999, http:dublincore.org/documents/1999/07/02/dces/, retrieved Feb. 19, 2009, 5 pages.

Fielding et al., "Hypertext Transfer Protocol—HTTP/1.1", Jun. 1999, ftp:ftp.isi.edu/in-notes/rfc2616.txt, retrieved Aug. 13, 2008, 165 pages.

Hamilton, "JPEG File Interchange Format", C-Cube Microsystems, Sep. 1, 1992, http:www.w3.org/Graphics/JPEG/jfif3.pdf, retrieved Aug. 13, 2008, 9 pages.

Hunter et al., "An Indexing, Browsing, Search, and Retrieval System for Images Based on the Embedded Metadata", Sep. 1999, http:archive.dstc.edu.au/RDU/staff/jane-hunter/PNG/paper.html, retrieved Aug. 13, 2008, 13 pages.

International Press Telecommunications Council, IPTC Standards "IPTC Core Schema for XMP, Version 1.0, Specification Document, Document Revision 8", 2005, IPTC, 15 pages.

Joint Photographers Expert Group (JPEG), "JPEG 2000 Image Coding System", Mar. 16, 2000, Final Committee Draft Version 1.0 ISO/IEC CD15444-1:2000, http:www.jpeg.org/public/fcd1544-1.pdf, retrieved Aug. 13, 2008, 205 pages.

Lafon et al., "Jigsaw 2.0 Internal Design", Jul. 30, 1999, http:www.w3.org/Jigsaw/Doc/Programmer/design.html. retrieved Aug. 13, 2008, 5 pages.

Lassila et al., "Resource Description Framework (RDF) Model and Syntax Specification", Feb. 22, 1999, http:www.w3.org/TR/1999/REC-rdf-syntax-19990222/, retrieved Feb. 19, 2009, 45 pages.

Wolf et al., "Date and Time Formats", Sep. 15, 1997, Submission to W3C.URL: http:www.w3.org/TR/1998/NOTE-datetime-19980827, retrieved Aug. 13, 2008, 3 pages.

Skonnard, Aaron, "Understanding SOAP", MSDN, Mar. 2003, Available online at http:msdn.microsoft.com/en-us/library/ms995800.aspx, © Microsoft Corporation, Mar. 2003, retrieved Feb. 19, 2009 12 pages.

Final Office action, mailed Aug. 3, 2009 in co-pending U.S. Appl. No. 10/943,767, 16 pages.

* cited by examiner

132

134

136

MANAGING MEDIA-CONTENT LICENSES, INCLUDING OPTION FORMATION

BACKGROUND

Creation of media designs for use in media campaigns may involve the selection of content for inclusion in the media design. Typically, in the design process, multiple media designs may be created, and may each have 'candidate' content incorporated in the design. For example, multiple media designs may be created having differing digital images, and a design may be selected from the multiple media designs. The content selected for the multiple media designs may have ownership rights, and the owner of the content may provide access to 'comp' (complimentary) versions of the content that may be included in the proposed media designs. 'Comp' assets may be assets provided by the owner of the assets for a limited time and/or for a limited use, such as non-public use for purposes of producing a proposed media design, for example. After a design is selected, the content in the selected design may be licensed, so that the design may be used as part of a media campaign. The 'comp' versions of the content in the selected design may then be replaced with the licensed content, for example. However, if the content is available to license by other designers, by the time the design process is complete, the content may no longer be available to license, such as if the license granted to the other designer is an exclusive license.

DESCRIPTION OF THE DRAWING FIGURES

The subject matter regarded as the claimed subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
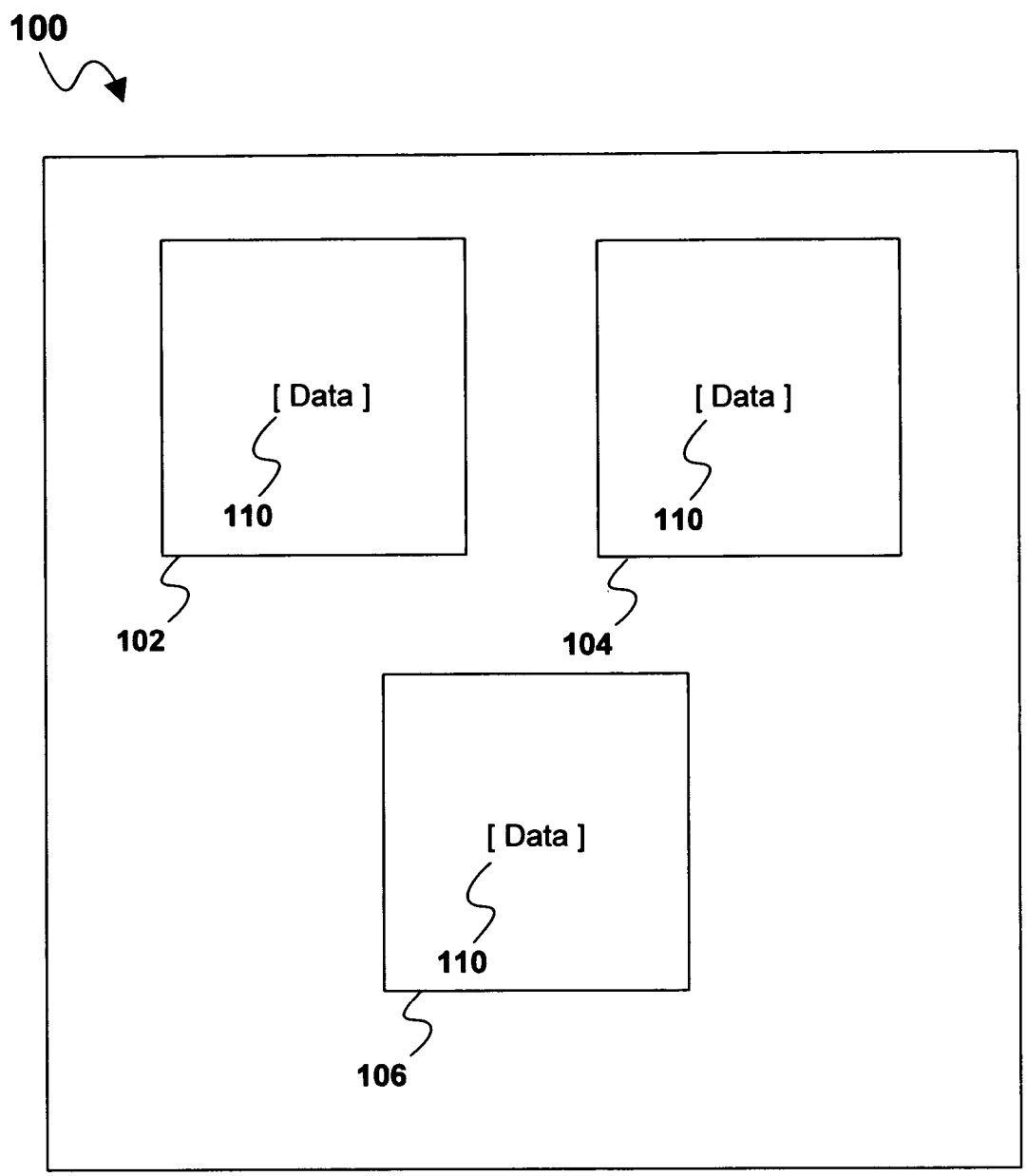
FIG. 1 is a block diagram of a media design, in accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail.

Some portions of the detailed description that follows are presented in terms of algorithms, programs or the like and/or symbolic representations of operations on data bits or binary digital signals within a computer memory. These algorithmic descriptions and representations may be the techniques used in the data processing arts to convey the arrangement of a computer system or other information handling system to operate according to the programs.

An algorithm may be generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

Embodiments may include apparatuses for performing the operations herein. This apparatus may be specially constructed for the desired purposes, or it may comprise a general purpose computing device selectively activated or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will be apparent from the description below. In addition, embodiments are not described with reference to any particular programming language. It will be appreciated that a variety of programming languages may be used to implement the teachings of the claimed subject matter as described herein.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

Referring now to FIG. 1, there is illustrated a block diagram of a media design 100, in accordance with at least one embodiment. As shown in FIG. 1, media design 100 may include content 102, 104 and 106. Design 100 may comprise a web page, a print brochure, or one or more types of media designs, and may additionally be embodied in one or more forms, such as in print or electronic form. In one embodiment, media design 100 may be embodied as an Adobe® Portable Document Format file specified by Adobe Systems Incorporated of San Jose, Calif., USA. Media design 100 may be created by use of a content creation or editing program interface, such as Adobe® Premiere® Pro 1.5 or the like, available from Adobe Systems Incorporated of San Jose, Calif., USA. However, these are just a few examples, and it is worthwhile to note that the claimed subject matter is not limited in this respect, and may be at least partially created by use of content creation and editing software in addition to the software described herein. Content, in this embodiment, may comprise digital images, but the claimed subject matter is not so limited. For example, content may include one or more types of temporal or non-temporal content that may be suitable for incorporation in a media design, and may include video, audio, images, illustrations, graphics, text, tables or the like. Content may additionally be referred to herein as digital media assets, and these terms may be used interchangeably. The digital media assets may be obtained from one or more providers of digital media assets, such as Getty Images, Inc., of Seattle, Wash., USA or Corbis of Seattle, Wash., USA, for example. However, in alternative embodiments, the content may be obtained from one or more other sources, such as from the public domain, for example.

The digital media assets may have ownership rights, and the owner may permit use of the assets for particular purposes, such as a non-public use including creating a proposed media design. The digital media assets may be included in media design 100, which may comprise a proposed design, created for the purposes of presenting to a client and/or a reviewing body, for example. Media design 100 may contain one or more 'candidate' digital media assets, for example. The 'candidate' digital media assets may comprise 'comp' (complimentary) assets. The 'comp' assets may be provided by the owner of the asset for a limited time and/or for a limited use, such as non-public use including producing a proposed media design, for example. As illustrated in FIG. 1, digital media assets 102, 104 and 106 may be marked in one or more manners. For example, the digital media assets may be marked with data 110, which may additionally be referred to as a tag, for example. Data 110 may comprise status information for the assets, such as whether the asset is a 'comp'. The use of data 110 may depend at least in part on the type of media design 100 or the type of asset. For example, if media design 100 comprises a proposed design, not yet implemented, such as in a media campaign, the digital media assets may comprise 'comp' assets, and data 110 may indicate that the assets are 'comp' assets. Conversely, data 110 may not be utilized on digital media assets that have been licensed, such as assets that may be implemented in a media campaign, although these are just examples, and the claimed subject matter is not limited in this respect.

As described previously, one or more digital media assets 102, 104 and 106 may be incorporated in a media design, such as design 100. One or more designs may be produced, which may utilize varying 'candidate' digital media assets. The one or more designs may subsequently be reviewed and/or approved by a reviewer, such as a client and/or reviewing body. The reviewer may select a particular design, such as design 100, and, if the digital media assets 102, 104 and 106 have associated ownership rights, the assets may licensed from holder of the rights, for example. The licensed assets may be incorporated in a final design, which may be utilized, such as in a media campaign, such as a print or televised campaign, for example. However, between the time that design 100 is created and the time design 100 is approved, digital media assets 102, 104 and/or 106 may no longer be available. This may be due to the assets being licensed and/or purchased by other designers, for example. Thus, the designer may then repeat the design process, and select differing assets, which may result in increased cost and/or time to produce an approved design. Implementation of a content management system may address one or more of these limitations. An example of a content management system that may be utilized is at least partially illustrated in FIGS. 2 and 3, and explained in more detail herein.

Figure 2:
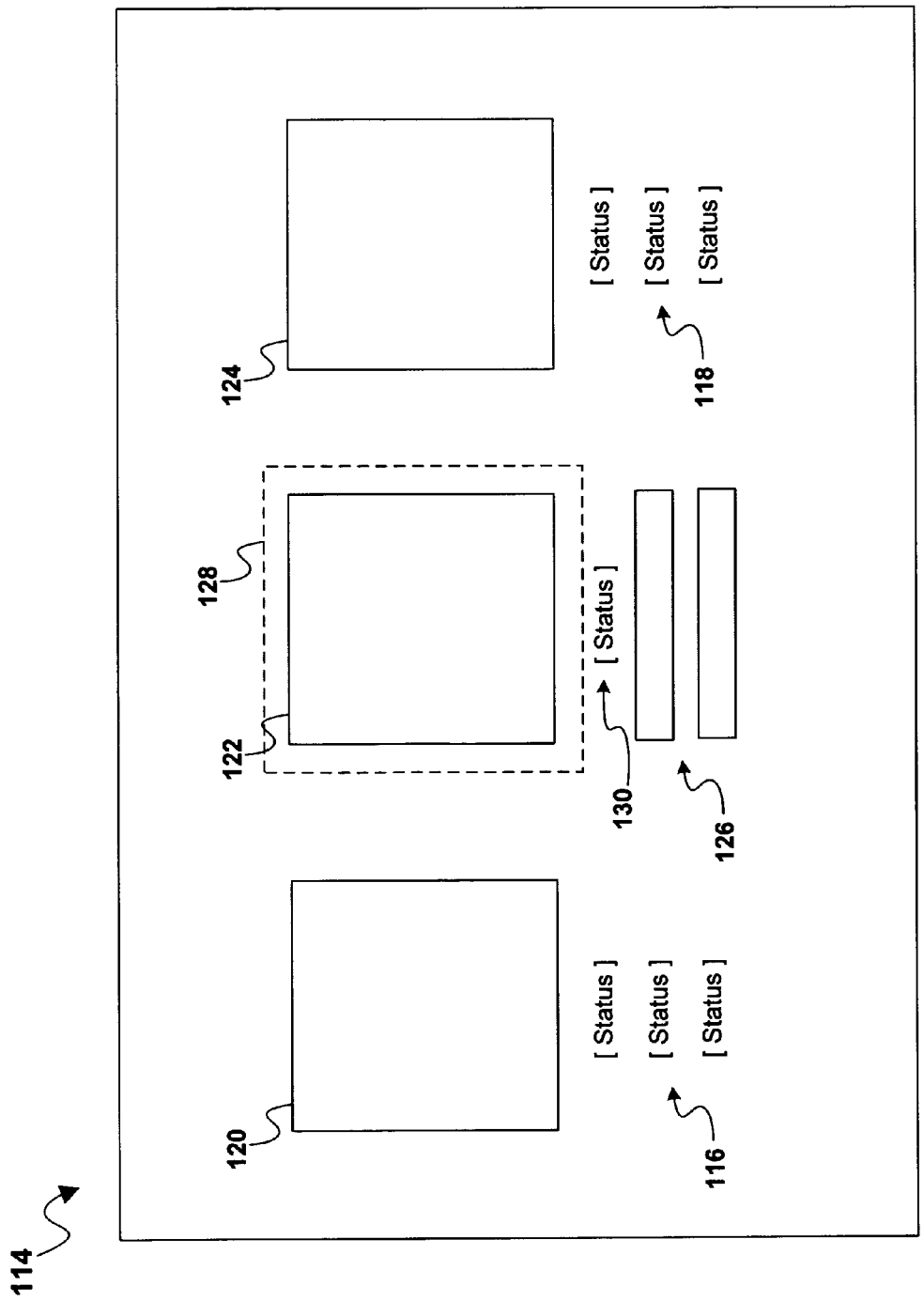
FIG. 2 is a block diagram of a content management system user interface, in accordance with one or more embodiments.

Referring now to FIG. 2, a block diagram of a user interface that may be utilized for selecting, licensing and/or reserving one or more digital media assets will be discussed. Illustrated in FIG. 2 is one embodiment of a user interface 114, which may be utilized to display and/or manage digital media assets. User interface 114 may be displayed on an electronic display of a computing system, and may utilize software to display digital media assets 120, 122 and 124. The software may comprise local software running on a client system or may comprise remote software running on a remote system, for example. User interface 114 may be capable of displaying one or more digital media assets 120, 122 and 124, along with additional data fields 116, 118 and 130. These displayed digital media assets may include one or more types of digital media, such as described previously. The digital media assets may be displayed in groups, for example, or may be displayed individually, but the claimed subject matter is not limited in this respect.

The digital media assets illustrated in FIG. 2 may be displayed in response to a request, such as a user request, for example. The user request may comprise a request such as may be may be provided to one or more databases. The one or more databases may comprise a database of digital media assets or associated parameters, such as rights of the digital media assets, availability of the assets for license, and/or subject matter of the assets, as just a few examples. The provided request may result in a query of the one or more databases, and may comprise a request to find one or more digital media assets based on one or more user-specified parameters. Parameters may include digital media asset type, availability, subject matter, content, and/or type of use, as just a few examples, but additional parameters may be utilized in other embodiments. The request may be utilized to query a database containing one or more assets and/or associated information, such as parameters, and the one or more databases may be remote or local with reference to a user, for example. The request may be provided by use of one or more networks, as will be explained in more detail later. In response to the request, one or more digital media assets may be displayed, such as assets 120, 122 and 124. Alternatively, one or more references to the assets may be displayed, such as a location in a database, such as a file path, and/or a representation of the assets, such as a lower-quality or reduced in size version of the asset, such as a 'thumbnail', for example. Additionally, in response to the request, information such as one or more parameters, including rights of the assets may be provided along with the assets, and may be displayed in one or more manners along with the assets. Here, status 116, 118 and 130 may be provided for assets 120, 124 and 122, respectively. Status 116, 118 and 130 may comprise tags and/or indicators, and may comprise information relating to the assets, such as parameters. Parameters may comprise rights of the assets, which may include availability of the asset, costs to reserve, duration of a current license and/or reservation, or number of users on a 'wait list' to reserve the asset, for example.

Although the claimed subject matter is not limited in this respect, a user may select one or more of the displayed assets of FIG. 2, such as by selecting an asset that meets the user's criteria, for example. In this embodiment, asset 122 is shown as being selected by a user, indicated by the dashed line 128. Fields 126 may be accessed if the user selects asset 122, for example, and may comprise user-enabled fields that may allow a user to enter data. Fields 126 may comprise dropdown menus, for example, and/or may comprise input fields that may allow a user to manually enter data. After digital media asset 122 is selected, the user may provide data by using fields 126. Data provided may include a request to alter the rights of the asset. Altering the rights, in this context, may comprise reserving or licensing the asset, for example. Additionally, data provided by use of fields 126 may comprise providing one or more terms of the requested reservation or license, such as a time or event element, including a requested duration and/or scope, for example. Additionally, if the asset selected is not currently available for licensing and/or reservation, the user may be able to select a 'notification' function by use of fields 126 that may provide notification to the user if the asset becomes available for licensing and/or reserving, or may be capable of entering a 'waiting list' for reserving or licensing the asset, for example. Additionally, although not illustrated in detail, the user may be provided with the capability of entering into a transaction, such as an e-commerce based electronic transaction, for example. The e-commerce transaction, although not limited in this respect, may comprise a selection transaction or the like. The transaction may comprise reserving the asset and specifying one or more terms of the reservation, such as a particular scope and/or duration of the reservation, such as an exclusive or non-exclusive reservation, or a reservation having a limited use, but the claimed subject matter is not limited in this respect. A reservation, in this context, may comprise securing, setting aside or setting apart an asset, such as to make the asset available to license, for example, and may be for a limited time or scope or duration, although the claimed subject matter is not so limited. The reservation may be exclusive or non-exclusive, for example, and may additionally be referred to as a license. The reservation may comprise an option to license, an option to purchase, and/or an option to use the asset, for example. Additionally, after completion of a transaction to reserve the asset, the rights of the asset may be altered, such as by updating a database of asset rights, for example. In this example, if updated, subsequent requests by the user or other users to find assets and/or alter the rights of assets may not result in the display of the asset, and/or may result in the display of the asset with an updated status, indicating that the asset 122 may not be available to reserve and/or license by other users, for example.

Figure 3:
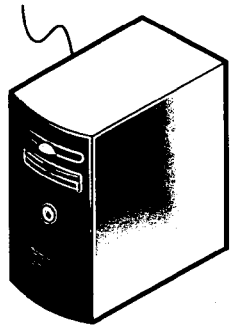
FIG. 3 is a schematic diagram of a content management system, in accordance with one or more embodiments.
Figure 3:
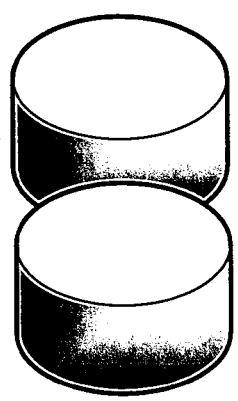

Referring now to FIG. 3, there is illustrated a schematic diagram of a content management system in accordance with at least one embodiment. Illustrated in FIG. 3 is system 132, which may comprise a computing device 134 coupled to one or more databases 136, which may be implemented via one or more servers (not shown), for example. The components of system 132 may, in combination, be capable of performing one or more of the functions described previously, such as providing a request to one or more databases, and providing one or more digital media assets and/or one or more parameters or other information such as rights of the assets in response to the request. Computing system 134 may be capable of executing software that may embody user interface 114 of FIG. 2, for example, and a user utilizing the computing system 134 may provide a request that may result in a query of one or more databases 136. Databases 136 may comprise one or more databases including one or more digital media assets and/or one or more parameters or other information about the assets, such as digital media asset rights. Digital media asset rights may include data regarding the status of licensing and/or ownership of one or more assets, for example. In operation, in this embodiment, the user may provide a request comprising one or more user-specified parameters, such as media type, availability, cost to license and/or to reserve, and/or type of use, as just a few examples. The request may result in a query being performed of one or more databases 136. The request may be transmitted to the one or more databases by use of a network, such as a (LAN), a wide area network (WAN), a metropolitan area network (MAN), or a wired network such as an Ethernet network. The request may be transmitted by a wireless network such as a wireless local area network or a cellular telephone network, or a combination of a wired and wireless network. Additionally, the request may be provided by use of the Internet or the like type of network. The request may result in the identification of one or more digital media assets that may satisfy the request. In response to the request, the one or more databases 136 may provide one or more digital media assets and/or one or more other parameters, such as rights of the assets, and this data may be provided to the user interface executing on computing device 134, for example. In this embodiment, the user may select and/or obtain rights to one or more of the identified assets, as will be explained in more detail with reference to FIG. 4, below.

Figure 4:
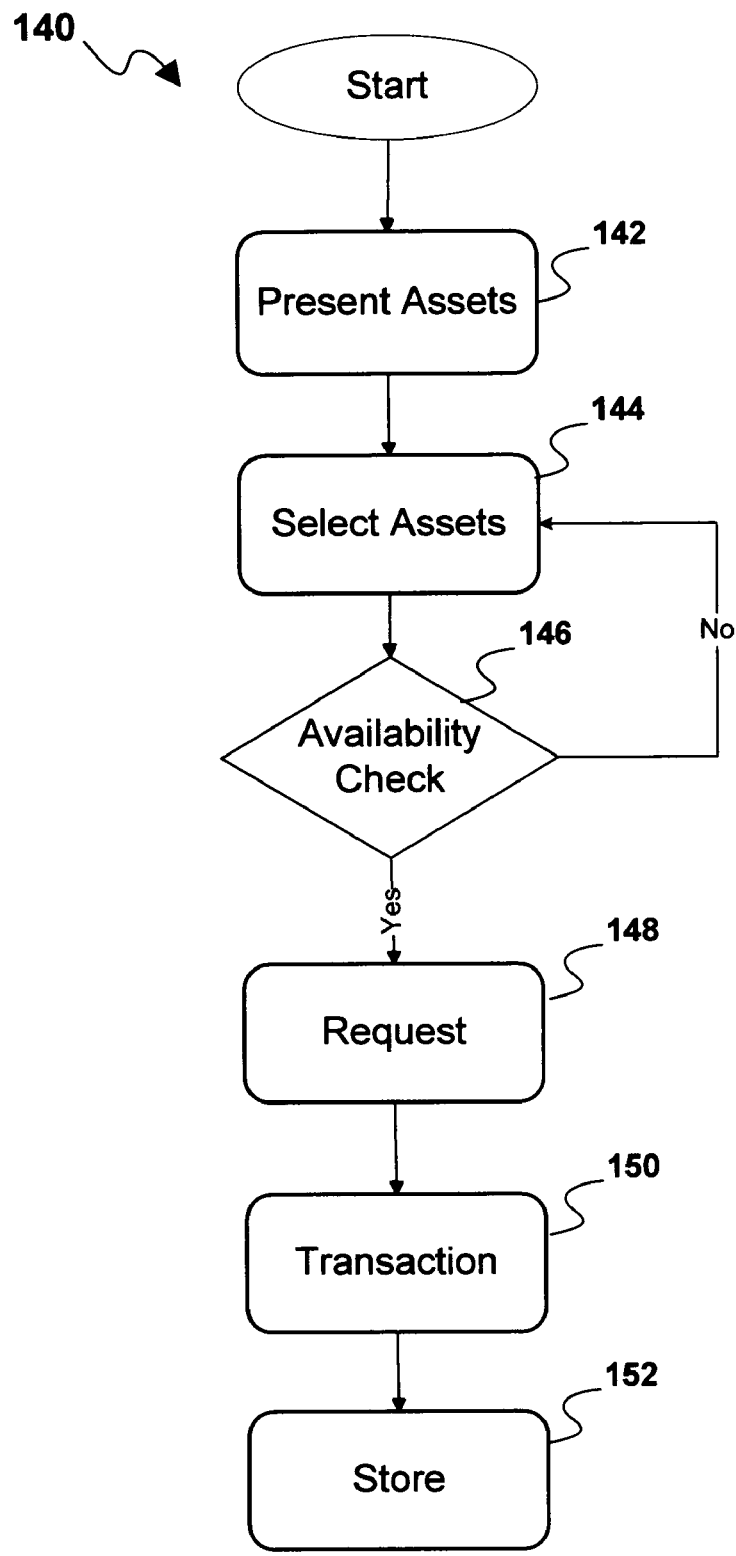
FIG. 4 is a flow diagram for a method of managing content, in accordance with one or more embodiments.

Referring now to FIG. 4, one embodiment of a technique for managing content, such as digital media assets, is illustrated by a flowchart 140. However, the order in which the blocks are presented does not necessarily limit claimed subject matter to any particular order. Additionally, intervening blocks not shown may be employed without departing from the scope of claimed subject matter. Flowchart 140 depicted in FIG. 4 may, in alternative embodiments, be implemented in a combination of hardware software and/or firmware, such as part of a computer system, and may comprise discrete and/or continual operations. In this embodiment, at block 142, one or more digital media assets may be presented, such as to a user. The digital media assets may be displayed on an electronic display, for example. The digital media assets may be displayed in modified form, such as reduced size and/or quality, such as 'thumbnails', for example. The one or more digital media assets may be displayed based at least in part on a request. The request may include data for querying one or more databases containing digital media assets, and may be provided such as to query of a local or remote database containing one or more digital media assets. The request may be provided in one or more manners, such as described previously.

In one embodiment, a database may be associated with one or more media servers that may store one or more digital media assets, such as in database form. A request may result in one or more of these servers providing data, such as to a user, such as digital media assets, for example. The digital media assets may be displayed via a user interface, such as user interface 118 of FIG. 2, for example, which may be executed by a computing device such as device 134 of FIG. 3. After presentation, at block 144, one or more of the presented digital media assets may be selected, such as by a user. An availability check may be performed at block 146, and the availability check 146 may comprise searching a database of digital media asset rights, which may be local or remote, for example. The availability check may comprise determining if the selected assets are available for licensing and/or reservation, and may additionally comprise determining one or more other parameters, such as if an asset may be available for licensing and/or reservation. If the availability check performed at block 146 results in the determination that an asset is not available, other assets may be selected at block 144 and the availability check at block 146 may be repeated. However, if the availability check performed at block 146 results in the determination that the selected asset is available for license and/or reservation, at block 148, a request may be made to alter the rights associated with a selected digital media asset. Altering the rights may comprise reserving a right to license the asset, and/or licensing the asset. In one embodiment, an opportunity may be provided to select a particular type of license and/or reservation, such as by selecting the scope and/or duration, for example. If the asset is selected, and a request is made to alter the rights of the asset, an opportunity may be provided to enter into a transaction at block 150. The transaction may comprise altering the rights of the asset, such as by obtaining a reservation of the asset, which may additionally be referred to as an option. At block 152, after entering into a transaction, the reservation data may be stored, such as in the database of digital media asset rights. Subsequent requests may result in displaying the asset and/or an associated reference with updated availability data, or may comprise not displaying the asset and/or associated reference in response to the subsequent request, for example.

Figure 5:
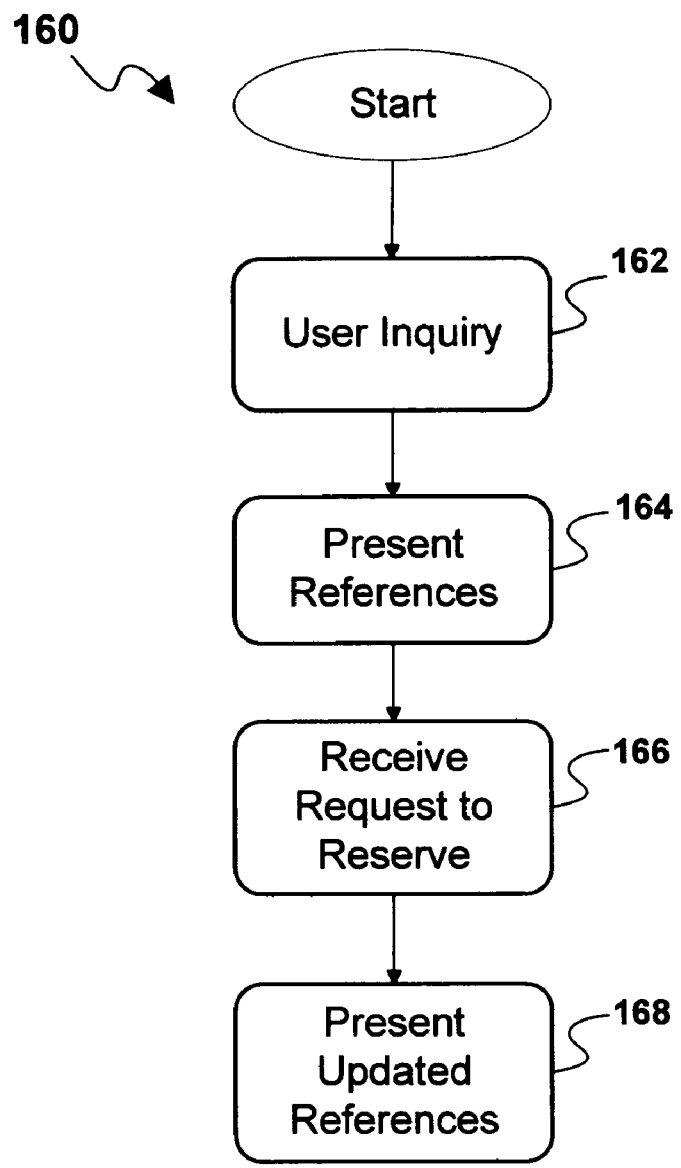
FIG. 5 is a flow diagram for a method of managing content, in accordance with one or more embodiments.

Referring now to FIG. 5, one embodiment of a technique for managing content, such as digital media assets, is illustrated by a flowchart 160. However, similar to FIG. 4, the order in which the blocks are presented does not necessarily limit claimed subject matter to any particular order, and intervening blocks not shown may be employed without departing from the scope of claimed subject matter. Flowchart 160 depicted in FIG. 5 may be implemented by a combination of hardware, software and/or firmware, such as part of a computer system, and may be implemented on one or more servers, such as servers that may be remote and/or local, for example. In this embodiment, at block 162, a user may query a database. The database may include multiple digital media assets and/or associated references or other information relating to the assets, and the associated references may include data such as location in a database, file name of the digital media asset, and a representation of the digital media asset, such as a 'thumbnail', for example. The request may comprise a request to find one or more digital media assets based on content, availability, associated rights and/or media type, for example. The request may be provided in one or more manners, such as described previously. In one embodiment, the database may be associated with one or more media servers that may store one or more digital media assets, information relating to the assets, references to assets, or rights data, such as availability to reserve and/or license an asset. A request may result in one or more of these servers providing data, for example. The data provided may comprise one or more references to one or more digital media assets, and may be presented at block 164. The references may comprise database location such as a file path, file name, or may comprise displaying the asset or a representation of the asset, such as by displaying a 'thumbnail' or 'comp' of the asset, for example. A request to reserve one or more of the assets referenced may be received at block 166. In response to the request, the rights associated with a referenced asset may be modified, such as by reserving the asset for licensing by the user. The selected asset may have its associated rights altered, and at block 168, the references presented at block 164 may be updated, such as by updating the availability of a selected asset, for example. Updating the references may result in not displaying a reference to the asset with the altered rights, or displaying the associated reference to the asset with updated data, such as data indicating that the asset is not available for reserving and/or licensing, for example.

It is now appreciated, based at least in part on the foregoing disclosure, that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing operations may comprise hardware, such as implemented to operate on a device or combination of devices, for example, whereas another embodiment may be in software and hardware, for example.

Likewise, an embodiment of a system capable of implementing one or more of the abovementioned operations may be implemented in firmware, or as any combination of hardware, software and/or firmware, for example. Additionally, all or a portion of one embodiment may be implemented to operate at least partially in one device, such as a display, a computing device, a set top box, a cell phone, and/or a personal digital assistant (PDA), for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, a set top box, a cell phone, a personal digital assistant (PDA), and/or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more types of memory, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
performing by one or more computers:
receiving from a first entity, a request to reserve a digital media asset comprising digital media data; and
in response to said request, altering rights associated with the digital media asset such that the digital media asset is reserved for the first entity, wherein reservation of the digital media asset is distinct from license acquisition for the digital media asset, wherein said altering is performed such that the rights are altered within a database to indicate that:
the digital media asset is unavailable to be licensed by other entities; and
an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

2. The method of claim 1, and further comprising providing a reduced quality version of the digital media asset, and updating the reduced quality version such that the reduced quality version of the digital media asset includes an indication that the digital media asset has been reserved.

3. The method of claim 1, and further comprising providing the request to reserve to a rights database.

4. The method of claim 2, wherein the updating includes displaying the reduced quality version of the digital media asset along with data indicating that the digital media asset has been reserved.

5. The method of claim 4, wherein said updating comprises updating the data to indicate that the digital media asset is no longer available for subsequent reserving.

6. The method of claim 2, wherein said updating comprises no longer presenting the digital media asset.

7. The method of claim 2, wherein said reduced quality version of a digital media asset comprises a representation of the digital media asset and one or more of: file name of the digital media asset, or a location in a database of the digital media asset.

8. The method of claim 2, wherein the reduced quality version of the selected digital media asset comprises a comp version of the selected digital media asset.

9. The method of claim 1, wherein the license to the digital media asset is a license to use the digital media asset or ownership of the digital media asset.

10. A method, comprising:
performing by one or more computers:
accessing a database of digital media assets;
requesting one or more digital media assets to be provided to a first entity;
receiving a selection of a digital media asset from the first entity, wherein the selected digital media asset comprises digital media data; and
performing a transaction resulting in a reservation of the selected digital media asset for the first entity, wherein reservation of the digital media asset is distinct from license acquisition for the digital media asset, wherein said performing includes altering rights in a rights database to indicate that:
the digital media asset is unavailable to be licensed by other entities; and
an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

11. The method of claim 10, wherein said reservation is dependent on a time or event element.

12. The method of claim 11, wherein said time or event element comprises a limited use of the selected at least one digital media asset.

13. The method of claim 10, wherein a reduced quality version of the selected digital media asset is provided to the first entity based at least in part on one or more search parameters, including digital media asset type, availability, cost to license, or limitations of scope or use.

14. The method of claim 13, wherein the reduced quality version of the selected digital media asset comprises a comp version of the selected at least one digital media asset.

15. The method of claim 10, wherein the license to the digital media asset is a license to use the digital media asset or ownership of the digital media asset.

16. A storage medium comprising: computer code stored on the storage medium, said computer code comprising instructions for accessing data, wherein at least a portion of said data comprises instructions, that, when executed, cause a computing system to:
receive from a first entity, a request to reserve a digital media asset comprising digital media data; and
in response to the request, alter rights associated with the digital media asset such that the digital media asset is reserved for the first entity, wherein reservation of the digital media asset is distinct from license acquisition for the digital media asset; wherein the rights are altered within a database to indicate that:
the digital media asset is unavailable to be licensed by other entities; and
an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

17. The storage medium of claim 16, wherein said instructions, when executed further cause the computing system to:
provide a reduced quality version of the digital media asset, and updating the reduced quality version such that the reduced quality version of the digital media asset includes an indication that the digital media asset has been reserved.

18. The storage medium of claim 16, wherein said instructions, if executed further cause the computing system to:
provide the request to reserve to a rights database.

19. The storage medium of claim 17, wherein said instructions further causing the computing system to update also includes to display the reduced quality version of the digital media asset along with data indicating that the rights of the digital media asset have been altered.

20. The storage medium of claim 19, wherein said instructions further causing the computing system to update also comprises to update data to indicate that the digital media asset is no longer available for subsequent reserving.

21. The storage medium of claim 17, wherein said instructions further causing the computing system to update also comprises to no longer present the digital media asset.

22. The storage medium of claim 17, wherein said reduced quality version of the digital media asset comprises a representation of the digital media asset and one or more of: file name of the digital media asset, or a location in a database of the digital media asset.

23. The storage medium of claim 17, wherein the reduced quality version of the selected digital media asset comprises a comp version of the selected digital media asset.

24. The medium of claim 16, wherein the license to the digital media asset is a license to use the digital media asset or ownership of the digital media asset.

25. A storage medium comprising: computer code stored on the storage medium, said computer code comprising instructions for accessing data, wherein at least a portion of said data comprises instructions, that, when executed, cause a computing system to:
   access a database of digital media assets;
   request one or more digital media assets to be provided to a first entity;
   receive a selection of a digital media asset from the first entity, wherein the selected digital media asset comprises digital media data; and
   perform a transaction resulting in a reservation of the selected digital media asset for the first entity, wherein reservation of the digital media asset is distinct from license acquisition for the digital media asset, wherein performing the transaction includes altering rights in a rights database to indicate that:
      the digital media asset is unavailable to be licensed by other entities; and
      an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

26. The storage medium of claim 25, wherein said reservation is dependent on a time or event element.

27. The storage medium of claim 26, wherein said time or event element comprises a limited use of the selected at last one digital media asset.

28. The storage medium of claim 25, wherein a reduced quality version of the selected digital media asset is provided to the first entity based at least in part on one or more search parameters, including digital media asset type, availability, cost to license, or limitations of scope or use.

29. The storage medium of claim 28, wherein the reduced quality version of the selected digital media asset comprises a comp version of the selected digital media asset.

30. The medium of claim 25, wherein the license to the digital media asset is a license to use the digital media asset or ownership of the digital media asset.

31. An apparatus, comprising:
   means for receiving from a first entity, a request to reserve a digital media asset comprising digital media data; and
   means for, in response to the request, altering the rights associated with the digital media asset such that digital media asset is reserved for the first entity, wherein reservation of the digital media asset is distinct from license acquisition for the digital media asset; wherein the rights are altered within a database to indicate that:
      the digital media asset is unavailable to be licensed by other entities; and
      an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

32. The apparatus of claim 31, and further comprising means for providing a reduced quality version of the digital media asset, and updating the reduced quality version such that the reduced quality version of the one or more digital media assets includes data indicating that the one or more digital media assets have been reserved.

33. The apparatus of claim 31, and further comprising means for providing the request to reserve to a rights database.

34. The apparatus of claim 32, wherein the means for updating includes means for displaying the one or more reduced quality versions of the one or more digital media assets along with data indicating that the one or more digital media assets have been reserved.

35. The apparatus of claim 32, wherein said means for updating comprises means for updating data to indicate that the one or more digital media assets are no longer available for subsequent reserving.

36. The apparatus of claim 32, wherein said one or more reduced quality versions of the one or more digital media assets comprise a representation of the one or more digital media assets and one or more of: file name of the one or more digital media assets, or a location in a database of the one or more digital media assets.

37. The apparatus of claim 32, wherein the reduced quality version of the digital media asset comprises a comp version of the digital media asset.

38. The apparatus of claim 31, wherein the license to the digital media asset is a license to use the digital media asset or ownership of the digital media asset.

39. A system, comprising:
   a display to present a user interface;
   a database of digital media assets; and
   a database of digital media asset rights;
   wherein the system is configured to manage digital media asset rights by:
      requesting one or more digital media assets from the database of digital media assets to be provided to a first entity via said user interface;
      receiving a selection of a digital media asset from the first entity via the user interface, wherein the selected digital media asset comprises digital media data; and
      performing a transaction resulting in a reservation of the selected digital media asset for the first entity, wherein reservation of the digital media asset is distinct from license acquisition for the digital media asset, wherein said performing includes altering rights within the database of digital media asset rights to indicate that:
         the digital media asset is unavailable to be licensed by other entities; and
         an option to obtain a license to the digital media asset is exclusively assigned to the first entity such that the digital media asset is unavailable to be reserved by other entities, wherein said option comprises a right to subsequently acquire said license to the digital media data, said option to obtain the license being distinct from said license.

40. The system of claim 39, wherein said reservation has a time or event element.

41. The system of claim 39, wherein the system is configured to provide a reduced quality version of the digital media asset to the first entity based at least in part on one or more search parameters, including digital media asset type, availability, cost to license, or limitations of scope or use.

42. The system of claim 41, wherein the reduced quality version of the selected digital media asset comprises a comp version of the selected digital media asset.

43. The system of claim 39, wherein the license to the digital media asset is a license to use the digital media asset or ownership of the digital media asset.

* * * * *